(12) United States Patent
Koyama et al.

(10) Patent No.: US 8,083,217 B2
(45) Date of Patent: Dec. 27, 2011

(54) FLUID-FILLED TYPE VIBRATION DAMPING DEVICE

(75) Inventors: Hironori Koyama, Kasugai (JP); Koichi Hasegawa, Kasugai (JP); Atsushi Muramatsu, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 554 days.

(21) Appl. No.: 12/358,401

(22) Filed: Jan. 23, 2009

(65) Prior Publication Data
US 2009/0184447 A1    Jul. 23, 2009

(30) Foreign Application Priority Data
Jan. 23, 2008 (JP) .................... 2008-12200

(51) Int. Cl.
*F16F 15/027* (2006.01)
*F05F 5/00* (2006.01)
(52) U.S. Cl. ............... 267/140.14; 267/140.15; 267/219
(58) Field of Classification Search ............... 267/140.1, 267/140.13–140.15, 219
See application file for complete search history.

(56) References Cited

U.S. PATENT DOCUMENTS

| | | | | |
|---|---|---|---|---|
| 6,378,852 B1* | 4/2002 | Ticks et al. | ............ | 267/140.14 |
| 7,946,561 B2* | 5/2011 | Nemoto et al. | ......... | 267/140.14 |
| 2005/0258581 A1* | 11/2005 | Tanaka | .............. | 267/140.11 |
| 2009/0045560 A1* | 2/2009 | Fueki et al. | ............ | 267/140.15 |
| 2009/0102105 A1* | 4/2009 | Hasegawa et al. | .......... | 267/122 |
| 2011/0042872 A1* | 2/2011 | Hasegawa et al. | ....... | 267/140.14 |

FOREIGN PATENT DOCUMENTS

JP    2004-150546    5/2004

* cited by examiner

*Primary Examiner* — Ruth Ilan
(74) *Attorney, Agent, or Firm* — Oblon, Spivak, McClelland, Maier & Neustadt, L.L.P.

(57) ABSTRACT

A Fluid-filled type vibration damping device, which is configured to be free from the necessity of supplying a continuous application of electricity to a coil so as to maintain a movable valve body in either an opened state or a closed state, is provided. The device includes a cam mechanism, which transmits a rotational drive force of a motor to the movable valve body in the form of a reciprocating drive force. In the device, a first rotation angle switch is connected to a first control switch in series relative to a motor coil, and a second rotation angle switch is connected to a second control switch in parallel relative to the first switch. The first rotation angle switch is turned on in a state of a first angular range $\theta 1$, and the second rotation angle switch is turned on in a third angular range $\theta 3$. When the first control switch and the second control switch receive the same control signal, they are brought into respective inverted ON/OFF states. The first angular range $\theta 1$ includes a fourth angular range $\theta 4$, which has an angle different from at least a third angular range $\theta 3$. The third angular range $\theta 3$ includes a second angular range $\theta 2$, which has an angle different from at least the first angular range $\theta 1$.

7 Claims, 8 Drawing Sheets

FLUID-FILLED TYPE VIBRATION DAMPING DEVICE

INCORPORATION BY REFERENCE

The present invention is based on Japanese Patent Application No. 2008-012200, filed on Jan. 23, 2008, the entire contents of which are incorporated herein by reference.

BACKGROUND OF THE INVENTION

1. Field of the Invention

The present invention relates, in general, to a vibration damping device, which is interposed between parts to be connected to each other to make a vibration damping state, thus connecting the parts to each other in the vibration damping state and, more particularly, to a fluid-filled type vibration damping device, which executes a vibration damping function using vibration damping effects realized by flowing actions of a fluid charged in the device. In more detail, the present invention relates to a fluid-filled type vibration damping device, which is configured to switch a fluid passage communicating a pressure-receiving chamber, charged with a fluid and an equilibrium chamber between an opened state and a closed state.

2. Description of the Related Art

As an example of a conventional fluid-filled type vibration damping device, JP-A-2004-150546 (Patent document 1) discloses a fluid-filled type vibration damping device, which is configured to switch a fluid passage communicating a pressure-receiving chamber with an equilibrium chamber between an opened state and a closed state by actuating a movable valve body using pneumatic pressure or electromagnetic force, thus controlling the vibration damping performance thereof. The movable valve body can be actuated by the action of a magnetic field formed by a solenoid coil.

[Patent Document 1] JP-A-2004-150546

In this case, to maintain the movable valve body in either of the two states, it is necessary to supply a continuous application of electricity to the solenoid coil. However, to supply the continuous application of electricity to the solenoid coil, electric power consumption of the solenoid coil is increased and, at the same time, heat produced from the solenoid coil is increased, so that durability of the solenoid coil may be reduced.

SUMMARY OF THE INVENTION

Therefore, the present invention has been made in view of the above-mentioned problems, and an object of the present invention is to provide a fluid-filled type vibration damping device, which is configured to be free from the necessity of supplying the continuous application of electricity to the solenoid coil so as to maintain the movable valve body in either an opened state or a closed state.

In an aspect, the fluid-filled type vibration damping device according to the present invention comprises a main rubber elastic body connecting a first mounting member to a second mounting member; a pressure-receiving chamber partially defined by the wall of the main rubber elastic body and charged with non-compressible fluid; an equilibrium chamber partially defined by a flexible film and charged with non-compressible fluid; a fluid passage communicating the pressure-receiving chamber with the equilibrium chamber; a movable valve body switching the fluid passage between an opened state and a closed state by a reciprocating motion; a motor rotated in response to an electric current applied to a motor coil; a cam mechanism installed on a drive force transmitting path from the motor to the movable valve body and transmitting the rotational drive force of the motor to the movable valve body in the form of a reciprocating drive force; a control signal output unit for outputting a control signal composed of an ON/OFF signal; a first rotation angle switch, which is connected to the motor coil in series and is turned on when the rotation angle of the motor is within a first angular range, but is turned off when the rotation angle of the motor is within a second angular range which is different from the first angular range; a first control switch, which is connected to the first rotation angle switch in series and is turned on when the control signal is an ON signal, but is turned off when the control signal is an OFF signal; a second rotation angle switch, which is connected to the motor coil in series and is connected both to the first rotation angle switch and to the first control switch in parallel, and is turned on when the rotation angle of the motor is within a third angular range, but is turned off when the rotation angle of the motor is within a fourth angular range, which is different from the third angular range; and a second control switch, which is connected to the second rotation angle switch in series and is connected both to the first rotation angle switch and to the first control switch in parallel, and is turned on when the control signal is an OFF signal, but is turned off when the control signal is an ON signal, wherein the first angular range includes at least the fourth angular range and the third angular range includes at least the second angular range.

That is, the fluid-filled type vibration damping device according to the present invention is characterized in that it uses a cam mechanism, which transmits the rotational drive force of the motor to the movable valve body in form of a reciprocating drive force. Here, the motor is used for rotating the cam mechanism. When the motor rotates, the reciprocating direction of the movable valve body changes, and when the motor stops rotation, the reciprocating direction of the movable valve body is determined. As described above, in the fluid-filled type vibration damping device of the present invention, it is not required to continuously apply an electric current to the motor in order to maintain the position of the movable valve body. Thus, compared to the conventional solenoid coil, which must maintain a continuous electricity application state so as to maintain the position of the movable valve body, the fluid-filled type vibration damping device of the present invention can reduce the electric power consumption and can reduce the quantity of heat generated from the motor coil.

Here, the fluid-filled type vibration damping device of the present invention is characterized in that it comprises a first rotation angle switch, a second rotation angle switch, a first control switch and a second control switch. Because the fluid-filled type vibration damping device comprises the above-mentioned switches, the vibration damping device can determine the reciprocating direction of the movable valve body using the cam mechanism. Hereinbelow, the determination of the reciprocating direction of the movable valve body using the switches will be described in detail.

In the present invention, when both the first rotation angle switch and the first control switch are in respective ON states, or when both the second rotation angle switch and the second control switch are in respective ON states, an electric current is applied to the motor coil, so that the motor can be rotated. That is, when either the first rotation angle switch or the first control switch is in an ON state, and a remaining switch is in OFF state, and either the second rotation angle switch or the second control switch is in an ON state and a remaining switch is in an OFF sate, no electric current is applied to the motor coil, so that the motor cannot be rotated.

Hereinbelow, the change in motor operation between an ON state and an OFF state, which is executed in response to a change in the control signal between an ON signal and an OFF signal in a state in which an ON state of the first rotation angle switch is set as an initial state thereof, will be described in detail.

When the control signal is changed into an ON signal in a state in which the first rotation angle switch is in an ON state, the first control switch is changed from an OFF state to an ON state, so that the motor starts to rotate. When the first rotation angle switch is continuously turned on for a predetermined lengthy period of time so that the motor can complete a predetermined angular rotation, the first rotation angle switch is turned off. That is, even when the first control switch is retained in an ON state, the first rotation angle switch can be changed into an OFF state.

Here, because the first rotation angle switch is in the OFF state, the rotation angle of the motor is within the second angular range. Further, the third angular range, in which the second rotation angle switch is retained in an ON state, includes at least the second angular range. That is, in a state in which the first rotation angle switch is in an OFF state, the rotation angle of the motor is within the third angular range. Thus, when the first rotation angle switch is in an OFF state, the second rotation angle switch realizes an ON state.

At this time, because the control signal is continuously kept as the ON signal, the second control switch is retained in the OFF state. That is, although the second control switch in the above state is retained in an ON state, the second rotation angle switch can be turned off. Thus, when the first rotation angle switch is turned off, the motor stops rotation because the first control switch is in an ON state, the second control switch is in an OFF state and the second rotation angle switch is in an ON state. Thus, the angular position of the motor is determined at the angle of rotation, at which the first rotation angle switch is turned off.

Thereafter, the control signal is changed from an ON signal into an OFF signal, so that the second control switch is turned on. In the above state, the second rotation angle switch is in an ON state, so that the motor restarts rotation. When the second rotation angle switch is continuously turned on for a predetermined lengthy period of time so that the motor completes a predetermined angular rotation, the second rotation angle switch is turned off. That is, although the second control switch in the above state is retained in an ON state, the second rotation angle switch can be turned off.

Here, the second rotation angle switch is in an OFF state, and the rotation angle of the motor is within the fourth angular range. Further, the first angular range, at which the first rotation angle switch is in an ON state, includes at least the fourth angular range. That is, when the second rotation angle switch is in an OFF state, the rotation angle of the motor is within the first angular range. Thus, when the second rotation angle switch is in an OFF state, the first rotation angle switch can be turned on.

Here, the control signal is retained in the OFF state, so that the first control switch is turned off. That is, although the first control switch in the above state is retained in the ON state, the first rotation angle switch can be turned off. Thus, when the second rotation angle switch is turned off, the motor stops rotation because the second control switch is in an ON state, the first control switch is in an OFF state and the first rotation angle switch is in an ON state. Thus, the angular position of the motor is determined at the angle of rotation, at which the second rotation angle switch is turned off.

That is, the fluid-filled type vibration damping device of the present invention can stop the rotation of the motor using a single control signal composed of an ON/OFF signal, so that the fluid-filled type vibration damping device is advantageous in that it can easily produce the control signal and prevent an increase in the number of contact ports.

It is preferred that the fluid-filled type vibration damping device of the present invention be preset such that the period from a time at which the control signal is changed into an ON signal to a time at which the control signal is changed into an OFF signal is longer than the period from a time at which the control signal is changed into an ON signal to a time at which the first rotation angle switch is turned off; and the period from a time at which the control signal is changed into an OFF signal to a time at which the control signal is changed into an ON signal is longer than the period from a time at which the control signal is changed into an OFF signal to a time at which the second rotation angle switch is turned off.

Thus, the fluid-filled type vibration damping device of the present invention can reliably stop rotation of a motor. Here, the period from a time at which the control signal is changed into an ON signal to a time at which the first rotation angle switch is turned off, or the period from a time at which the control signal is changed into an OFF signal to a time at which the second rotation angle switch is turned off, can be controlled by controlling the relationship between the rotational speed of the motor per unit time, the first angular range and the third angular range.

In the fluid-filled type vibration damping device of the present invention, it is preferred that, when either rotating direction of the motor is set as a first direction, an end of the first directional of the first angular range be within the third angular range and an end of the first directional of the third angular range be within the first angular range.

In other words, the first angular range and the third angular range are preset such that opposite ends thereof overlap with each other within a predetermined angular range. Therefore, when the angular position of the first rotation angle switch exceeds the first angular range, the angular position of the second rotation angle switch must be within the third angular range. Further, when the angular position of the second rotation angle switch exceeds the third angular range, the angular position of the first rotation angle switch must be within the first angular range. Thus, the vibration damping device of the present invention is preset such that the second rotation angle switch must be turned on after the first rotation angle switch is turned off, and, at the same time, the first rotation angle switch must be turned on after the second rotation angle switch is turned off. Therefore, the vibration damping device of the present invention can reliably stop the rotation of the motor.

The fluid-filled type vibration damping device according to the present invention may comprise:
- a round terminal formed around a rotor shaft of the motor such that the round terminal covers the rotation angular range of the motor, a first terminal formed on the rotor shaft of the motor at a location within the first angular range of the motor, and a second terminal formed on the rotor shaft of the motor at a location within the third angular range of the motor; and
- a brush mounted to a stator of the motor and coming into contact with the round terminal, the first terminal or the second terminal in response to a rotation of the motor, wherein the first rotation angle switch comprises the round terminal, the first terminal and the brush, and the second rotation angle switch comprises the round terminal, the second terminal and the brush.

As described above, each of the first and second rotation angle switches can be produced using a brush, so that the present invention can easily realize smallness of the vibration damping device.

In the fluid-filled type vibration damping device of the present invention, the motor may be selected from motors which can generate a unidirectional rotational drive force. Even when a motor which can generate a unidirectional rotational drive force is used as the motor in the vibration damping device, the motor can reliably execute operation for stopping a rotation thereof. Further, because the motor is configured to generate a unidirectional rotational drive force, the motor may be of a simple construction.

Further, in the fluid-filled type vibration damping device of the present invention, the motor may be a DC motor. DC motors are widely used, cheap motors. Even when a DC motor is used as the motor in the vibration damping device, the motor can reliably execute operation for stopping a rotation thereof. Thus, the manufacturing cost of the vibration damping device can be reduced. Further, the DC motor can be operated whether an electric current is applied thereto or not, so that the DC motor can be operated using a single control signal. Thus, the number of control signals for the motor can be minimized.

In the fluid-filled type vibration damping device of the present invention, it is preferred that the fluid passage comprise a first orifice passage and a second orifice passage which is tuned in a frequency band higher than that in the first orifice passage, and the movable valve body be configured to change the second orifice passage between an opened state and a closed state.

As described above, in the Fluid-filled type vibration damping device of the present invention having a double orifice structure comprising the first and second orifice passages, the state of the second orifice passage, which is tuned in a frequency band higher than that of the first orifice passage, can be changed between the opened state and the closed state through a reciprocating motion of a movable valve body actuated by a cam mechanism, so that the vibration damping device of the present invention can realize both a first vibration damping effect capable of damping a vibration of the frequency band in which the first orifice passage is tuned, and a second vibration damping effect capable of damping a vibration of the frequency band in which the second orifice passage is tuned.

BRIEF DESCRIPTION OF THE DRAWINGS

The above and other objects and features of the present invention will become apparent from the following description of a preferred embodiment, given in conjunction with the accompanying drawings, in which.

DESCRIPTION OF THE ELEMENTS IN THE DRAWINGS

Figure 1:
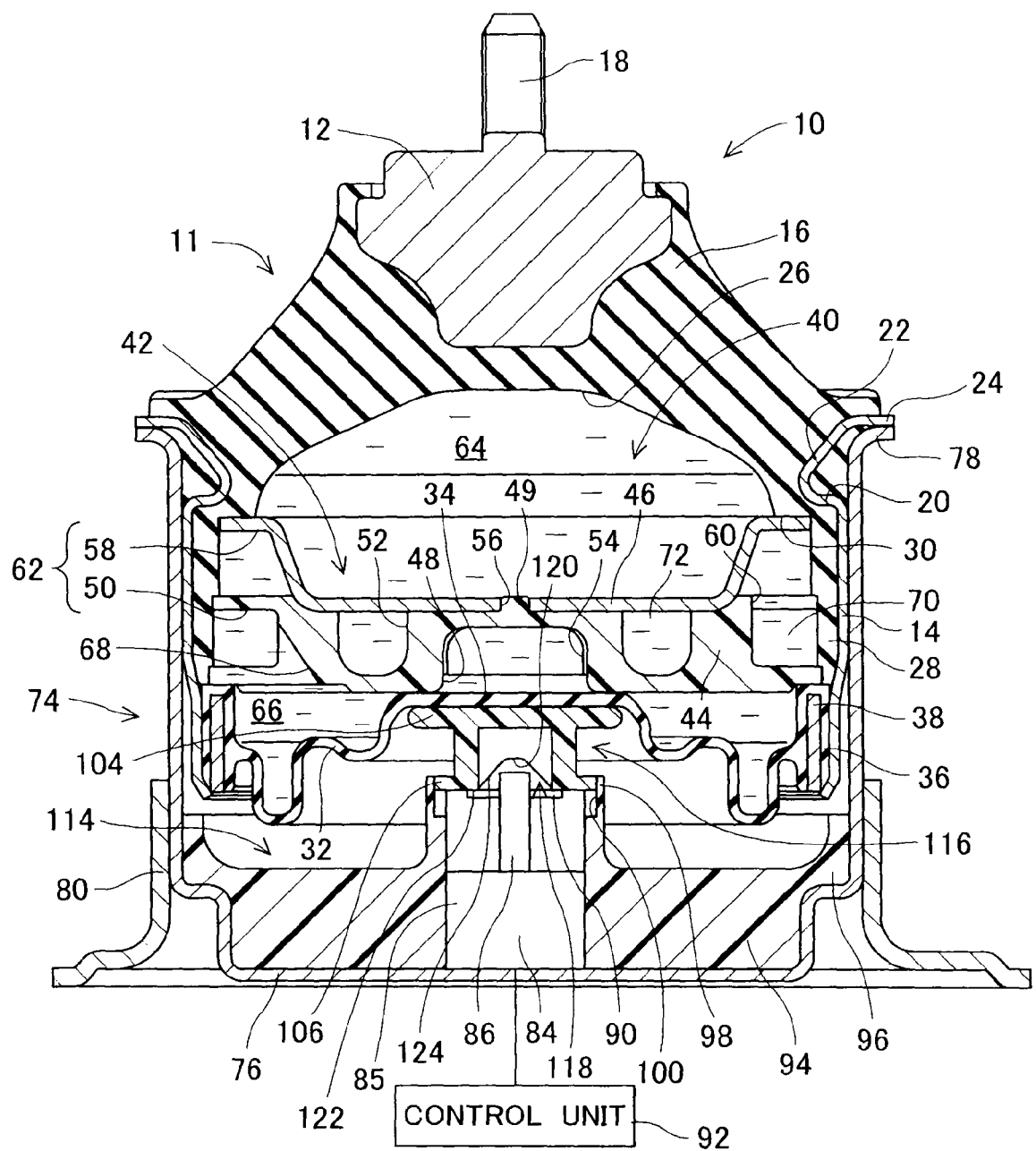
FIG. 1 is a view illustrating the construction of a Fluid-filled type vibration damping device according to the present invention, in which a valve unit is located in an upper position thereof.

10: engine mount (fluid-filled type vibration damping device)
11: mounting body
12: first mounting member
14: second mounting member
16: main rubber elastic body
28: sealing rubber layer
32: diaphragm
38: fixing member
42: partition unit
64: pressure-receiving chamber
66: equilibrium chamber
70: first orifice passage (fluid passage)
72: second orifice passage (fluid passage)
74: bracket unit
114: actuator
84: motor
86: rotor shaft
86a: motor coil
200: brush unit
90: pin (cam mechanism)
94: support member
116: valve unit (movable valve body)
118: cam groove (cam mechanism)
92, 392, 492: control unit
201: first rotation angle switch
202: second rotation angle switch
203, 205: round terminal
204: first terminal
206: second terminal
207: brush
210: engine ECU (control signal output unit)
220: motor drive circuit
221: N-channel MOSFET (first control switch)
223: N-channel MOSFET (second control switch)
θ1: first angular range
θ2: second angular range
θ3: third angular range
θ4: fourth angular range

DETAILED DESCRIPTION OF THE PREFERRED EMBODIMENTS

Various embodiments of the present invention will now be described in detail with reference to the accompanying drawings.

Figure 2:
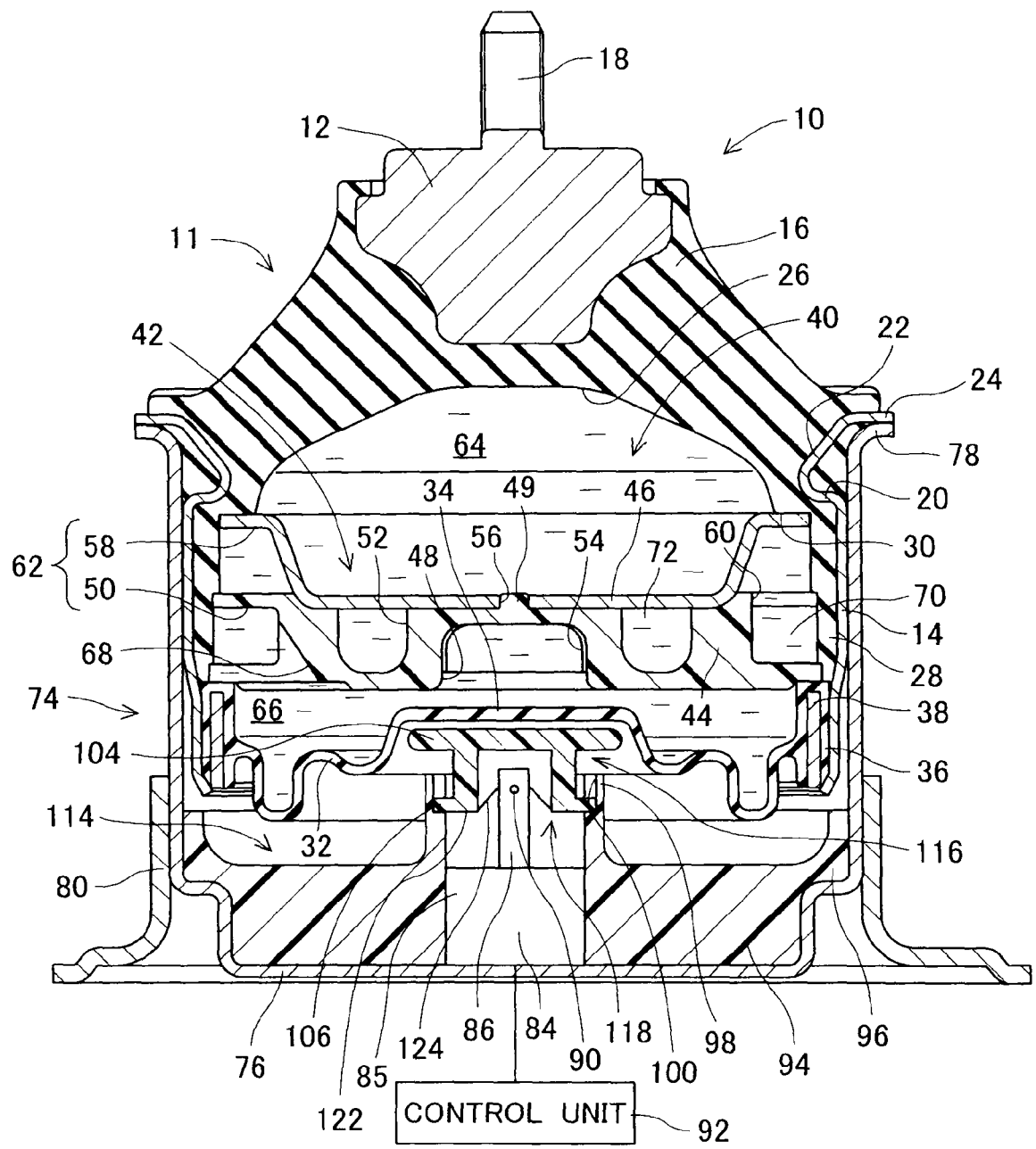
FIG. 2 is a view illustrating the construction of the Fluid-filled type vibration damping device according to the present invention, in which the valve unit is located in a lower position thereof.

The Fluid-filled type vibration damping device according to an embodiment of the present invention will be described hereinbelow with reference to FIG. 1 and FIG. 2, in which the vibration damping device is adapted to an engine mount 10 of a vehicle. FIG. 1 is a view illustrating the construction of the Fluid-filled type vibration damping device according to the present invention, in which a valve unit is located in an upper position thereof. FIG. 2 is a view illustrating the construction of the Fluid-filled type vibration damping device according to the present invention, in which the valve unit is located in a lower position thereof. Further, in the following description, for ease of description, the upward and downward directions in FIG. 1 and FIG. 2 will be referred to as the axial directions or the upward and downward directions, and the directions perpendicular to the axial directions will be referred to as the transverse directions. Further, the upper side of FIG. 1 and FIG. 2 will be referred to simply as the upper side and the lower side of FIG. 1 and FIG. 2 will be referred to simply as the lower side.

(1) Construction of the Engine Mount.

As shown in FIG. 1 and FIG. 2, the engine mount 10 comprises a mounting body 11, a bracket unit 74, an actuator 114 and a control unit 92.

The mounting body 11 comprises a first mounting member 12, a second mounting member 14, a main rubber elastic body 16, a sealing rubber layer 28, a diaphragm 32, a fixing member 38, and a partition unit 42.

The first mounting member 12 is a block-shaped member preferably made of iron or aluminum alloy. The upper part of the first mounting member 12 has a circular block shape and the lower part of the first mounting member 12 has a conical block shape, the diameter of which gradually increases in an upward direction. Further, a mounting bolt 18 is integrally formed on the upper end of the first mounting member 12 such that the bolt 18 protrudes upwards. The first mounting member 12 is mounted to a power unit (not shown) of the vehicle using the mounting bolt 18.

The second mounting member 14 has a circular shape, which has a diameter larger than that of the first mounting member 12 and a thickness smaller than that of the first mounting member 12. In the same manner as described for the first mounting member 12, the second mounting member 14 is a highly rigid member, which is made of iron or aluminum. Further, the upper end of the second mounting member 14 is provided with a flange-shaped stepped part 20, which is bent inwards in a radial direction. A tapered part 22 is integrally formed on an inner circumferential end of the stepped part 20 such that the diameter of the tapered part 22 gradually increases in an upward direction. A flanged part 24 is formed on the upper end of the tapered part 22 such that the flanged part 24 extends outwards in the radial direction. Further, the first mounting member 12 is coaxially placed in the opening of the second mounting member 14 having the flanged part 24 such that the first mounting member 12 is spaced apart from the flanged part 24 of the second mounting member 14. The second mounting member 14 is mounted to a vehicle body (not shown) using a bracket unit 74, which will be described later herein.

The main rubber elastic body 16 is composed of a rubber elastic body having a thin frusto-conical shape. The large diameter end of the main rubber elastic body 16 or the lower end of the main rubber elastic body 16 in FIG. 1 is provided with a large-diameter depression 26, which is open downwards and has a dome shape or bowl shape. Further, the lower end of the first mounting member 12 is inserted into the small-diameter end of the main rubber elastic body 16 and is attached thereto through vulcanizing. The upper end of the second mounting member 14 having the tapered part 22 is fitted over the outer circumferential surface of the large-diameter end of the main rubber elastic body 16 and is attached thereto through vulcanizing. As described above, the main rubber elastic body 16 is interposed between the first mounting member 12 and the second mounting member 14 so as to elastically couple the two mounting members 12 and 14 to each other. Further, the main rubber elastic body 16 closes an opening, which is formed in an end of the second mounting member 14 (the upper end of the second mounting member in FIG. 1), so that it is leak-proof to fluid. In the embodiment of the present invention, the main rubber elastic body 16 is produced as an integral vulcanized product, which is integrally formed both with the first mounting member 12 and with the second mounting member 14.

The sealing rubber layer 28 is a thin large-diameter tub shape, which is integrally formed on the outer circumferential surface of the large-diameter end of the main rubber elastic body 16 and extends downwards in an axial direction. The sealing rubber layer 28 is attached to the inner circumferential surface of the second mounting member 14, and the part of the inner circumferential surface of the second mounting member 14 which is located below the stepped part 20 of the second mounting member 14 is almost covered with the sealing rubber layer 28. Further, a ring-shaped stepped surface 30 is formed on the inner circumferential surface of the opening of the large-diameter depression 26 at a location inside the sealing rubber layer 28 such that the ring-shaped stepped surface 30 extends in a radial direction.

The diaphragm 32 is installed in the opening of a second end of the second mounting member 14, which is the opening formed in the lower end of the second mounting member 14 in FIG. 1. The diaphragm 32 is composed of a rubber film, which has a thin, disc shape of a large diameter. The outer circumferential edge part of the diaphragm 32 is of substantial flexibility so that the edge part can be easily loosened in an axial direction. Further, the central part of the diaphragm 32 is provided with a central contact part 34, which has a disc shape thicker than the edge part. Further, a circular ring-shaped fixing part 36 is integrally formed in the outer circumferential edge part of the diaphragm 32.

The fixing member 38 is a highly rigid member made of iron and has a large-diameter circular ring shape and is attached to the fixing part 36 of the diaphragm 32 in an embedded state through vulcanizing. Here, the diaphragm 32 is a vulcanized product integrated with the fixing member 38.

Further, the integral vulcanized product of the diaphragm 32 can be installed in an integral vulcanized product of the main rubber elastic body 16 having both the first mounting member 12 and the second mounting member 14. In other words, in order to install the diaphragm 32 in the main rubber elastic body 16, the diaphragm 32 is inserted into the second mounting member 14 of the main rubber elastic body 16 through an opening formed in the second end of the second mounting member 14 or the opening formed in the lower end of the second mounting member 14 in FIG. 1. Thereafter, the opening of the second mounting member 14 is subjected to a squeezing process, so that the fixing member 38 can be securely installed in the opening of the second mounting member 14. Thus, the diaphragm 32 can be securely installed in the second mounting member 14 so as to fluid-tightly cover the opening formed in the second end of the second mounting member 14 or the opening formed in the lower end of the second mounting member 14 in FIG. 1.

When the diaphragm 32 is installed in the second mounting member 14 as described above, a fluid sealing chamber 40 is defined inside the second mounting member 14 at a location between opposite surfaces of the main rubber elastic body 16 and the diaphragm 32, which face each other in an axial direction, such that the fluid sealing chamber 40 is isolated from the outside and can be charged with non-compressible fluid therein. Further, in the present invention, the kind of the non-compressible fluid charged in the fluid sealing chamber 40 is not limited, but is preferably selected from the group of alkylene glycol, polyalkylene glycol, silicon oil and a mixture thereof. Further, in order to efficiently realize the vibration damping effects based on flowing actions of fluid, which will be described later herein, it is preferred to use a low viscous fluid including clay of 0.1 Pa or less.

The partition unit 42 is received in the fluid sealing chamber 40 and is supported by the second mounting member 14. The partition unit 42 comprises a partition unit body 44 and a cover plate member 46.

The partition unit body 44 has a thick circular disc shape and is made of hard plastic or an aluminum alloy. Further, a circular central depression 48 is formed in the central part of the lower surface of the partition unit body 44 such that the depression 48 opens downwards. Further, a small-diameter central protrusion 49 is integrally formed on the upper surface of the central part of the partition unit body 44 such that the protrusion 49 protrudes upwards.

Further, a first circumferential groove 50 is formed in the outer circumferential edge part of the partition unit body 44. The first circumferential groove 50 is open in the outer circumferential surface of the partition unit body 44 and continuously extends in a circumferential direction of the partition unit body 44 to a predetermined length, which is less than one turn of the outer circumference of the partition unit body 44. Further, a groove 52 is formed in an intermediate part of the partition unit body 44. The groove 52 opens in the upper end surface of the partition unit body 44 and continuously extends a predetermined length between the central depression 48 and the first circumferential groove 50, which is less than one turn of a circumference. Further, one end of the groove 52 communicates with the central depression 48 through a communication path 54, which extends in a radial direction.

The cover plate member 46 is composed of a circular disc-shaped metal member. In the embodiment of the present invention, the outer circumferential edge part of the cover plate member 46 is stepped upwards and is located at a position higher than the central part of the cover plate member 46 in the axial direction. Further, the central part of the cover plate member 46 is provided with a circular through hole 56. The through hole 56 is a small-diameter hole, which corresponds to the central protrusion 49 of the partition unit body 44.

The cover plate member 46 overlaps the upper end surface of the partition unit body 44, and the central protrusion 49 of the partition unit body 44 is fitted into the through hole 56 of the cover plate member 46. Thus, the partition unit body 44 and the cover plate member 46 can be securely assembled with each other so as to produce the partition unit 42.

In the partition unit 42, the partition unit body 44 and the cover plate member 46 are in close contact with each other at central portions thereof. Further, the outer circumferential edge parts thereof are spaced apart from each other by a predetermined distance in the axial direction. Further, a second circumferential groove 58 is defined between the opposite surfaces of the spaced edges of the partition unit body 44 and the cover plate member 46. The second circumferential groove 58 extends in a circumferential direction. The second circumferential groove 58 continuously extends along the circumferential direction to a predetermined distance, which is less than one turn of the circumference of the partition unit body 44 or the cover plate member 46. Further, a partition wall (not shown), which is integrally formed with the partition unit body 44, is provided between opposite ends of the second circumferential groove 58, which extends in the circumferential direction. The partition wall partitions the second circumferential groove 58 into parts, each of which has a length less than one turn of the circumference.

Further, when the partition unit body 44 and the cover plate member 46 are assembled with each other as described above, a first end of the first circumferential groove 50 communicates with a first end of the second circumferential groove 58 through a connection window 60. The connection window 60 is open in the upper end surface of the partition unit body 44 in the first end of the first circumferential groove 50. Thus, a circumferential groove 62 having a spiral shape is formed both by the first circumferential groove 50 and by the second circumferential groove 58 such that the circumferential groove 62 extends to a predetermined length, which is less than two turns of the circumference.

As described above, the partition unit 42 constituting both the partition unit body 44 and the cover plate member 46 is arranged in the fluid sealing chamber 40. In order to install the partition unit 42 in the fluid sealing chamber 40, before the diaphragm 32 is installed in the second mounting member 14, the partition unit 42 is inserted into the second mounting member 14 through an opening formed in an end of the second mounting member 14, which is opposed to the end at which the second mounting member 14 is attached to the main rubber elastic body 16 through vulcanizing, or through an opening formed in the lower end of the second mounting member 14 of FIG. 1. Thereafter, the diaphragm 32 is inserted into the second mounting member 14 through the same opening. In the above state, the second mounting member 14 is subjected to a squeezing process, such as an eight directional squeezing, so that both the diaphragm 32 and the partition unit 42 are securely installed in the second mounting member 14.

In the state in which both the diaphragm 32 and the partition unit 42 are arranged in the second mounting member 14 as described above, the outer peripheral edge of the partition unit 42 is pressure-mounted to the stepped surface 30 of the main rubber elastic body 16 and, at the same time, the outer peripheral edge of the lower end surface of the partition unit 42 is pressure-mounted to the fixing member 38 by the fixing part 36, thus realizing fluid-tightness. Further, the outer circumferential surface of the partition unit 42 fluid-tightly overlaps the second mounting member 14 using the sealing rubber layer 28. Thus, the fluid sealing chamber 40 is divided into two parts, that is an upper part and a lower part, by the partition unit 42. In one side of the partition unit 42, a pressure-receiving chamber 64 is defined by a part of the wall of the main rubber elastic body 16 such that pressure inside the chamber 64 can be changed in response to an elastic deformation of the main rubber elastic body 16. Meanwhile, in the other side of the partition unit 42, an equilibrium chamber 66 is defined by a part of the wall of the diaphragm 32 such that the volume of the chamber 66 can be changed by an elastic deformation of the diaphragm 32. The non-compressible fluid inside the fluid sealing chamber 40 is charged both in the pressure-receiving chamber 64 and in the equilibrium chamber 66.

Further, the outer circumferential opening of the circumferential groove 62 formed in the outer circumferential edge part of the partition unit 42 is fluid-tightly sealed by the second mounting member 14. Further, the first end of the circumferential groove 62 communicates with the pressure-receiving chamber 64 through the connection window (not shown) formed in the cover plate member 46. The second end of the circumferential groove 62 communicates with the equilibrium chamber 66 through a communication window 68 formed in the partition unit body 44. That is, a first orifice passage 70, which extends to a predetermined length in a circumferential direction and functions as a fluid passage for communicating the pressure-receiving chamber 64 with the equilibrium chamber 66, is formed by the circumferential groove 62 of the partition unit 42.

In the embodiment of the present invention, the resonance frequency of the fluid, which flows through the first orifice passage 70, is tuned to realize a first vibration damping effect (high damping effect) such that the fluid can efficiently attenuate the vibration in a low frequency band of about 10 Hz corresponding to an engine shake frequency due to a resonance thereof.

Further, the opening of the groove 52 formed in the partition unit 42 is covered with the cover plate member 46 and the first end of the groove 52 communicates with the pressure-receiving chamber 64 through the communication window (not shown) formed in the cover plate member 46. The second end of the groove 52 communicates with the equilibrium chamber 66 through the central depression 48. Thus, a second orifice passage 72, which extends to a predetermined length in a circumferential direction and functions as a fluid passage communicating the pressure-receiving chamber 64 with the equilibrium chamber 66, is formed both by the groove 52 of the partition unit 42 and by the central depression 48.

In the embodiment of the present invention, the resonance frequency of the fluid, which flows through the second orifice passage 72, is tuned to realize a second vibration damping effect (low dynamic spring effect) such that the fluid can efficiently attenuate the vibration in a range of 20~40 Hz or in a high frequency band corresponding to an idling frequency due to a resonance thereof.

Further, the tuning for the resonance frequencies of the fluid flowing through the first and second orifice passages 70 and 72 can be realized by controlling the lengths and cross-sectional areas of the two orifice passages 70 and 72 in consideration of, for example, spring rigidities of the walls of both the pressure-receiving chamber 64 and the equilibrium chamber 66, which are the characteristic values based on the elastic strains of both the main rubber elastic body 16 and the diaphragm 32 corresponding to a pressure variation required to change the unit volumes inside the chambers 64 and 66. In general, frequencies, in which the phases of the pressure fluctuations transmitted through the two orifice passages 70 and 72 are changed to form resonant states, are selected as tuning frequencies of the orifice passages 70 and 72.

The above-mentioned mounting body 11 is attached to the bracket unit 74. The bracket unit 74 is configured as a highly rigid member made of iron and has a housing member 76 into which the mounting body 11 is fitted. The housing member 76 is configured as a cylindrical member having a bottom, with a flanged portion 78 formed around the upper end of the housing member 76. Further, a ring-shaped outer bracket 80 is mounted to the outer circumferential surface of the housing member 76 through welding. The outer bracket 80 is provided with a plurality of bolt holes (not shown), which are formed through the circumferential mount flange portion at a plurality of locations. The outer bracket 80 is mounted to the vehicle body using a plurality of locking bolts inserted into respective bolt holes.

The mounting body 11 is fitted downwards into the housing member 76 of the bracket unit 74 from the upper opening of the housing member 76. Further, the second mounting member 14 is fitted into the housing member 76, so that the mounting body 11 can be securely installed in the bracket unit 74. Here, the flanged part 24 formed around the upper end of the second mounting member 14 is in downward contact with the flanged portion 78 formed around the upper end of the housing member 76, so that a desired positioning of the second mounting member 14 relative to the housing member 76 can be realized.

The actuator 114 is installed in the bracket unit 74. The actuator 114 is placed at a location below the mounting body 11 and is installed in the bottom of the housing member 76. Further, after the actuator 114 is installed in the housing member 76, the mounting body 11 is installed in the bracket unit 74, thus producing the engine mount 10.

The actuator 114 comprises a motor 84, a brush unit 200, pins 90, a support member 94 and a valve unit 116.

In the present invention, it is preferred that a DC motor, which can produce a unidirectional rotational drive force, be used as the motor 84. The motor 84 is well-known to those skilled in the art and is very cheap. The motor 84 comprises a stator 85 and a rotor shaft 86, which is rotatable relative to the stator 85 and around which a motor coil 86a is wound. An electric current is applied to the motor coil 86a through a brush unit 200 mounted to the stator 85. When an electric current is applied to the motor coil 86a, the rotor shaft 86 is rotated relative to the stator 85. The construction and operation of the brush unit 200 will be described later herein.

The rotor shaft 86 is provided with a small-diameter circular hole, which is formed through an end portion of the rotor shaft 86 along a diametrical direction. A pin 90 having a small-diameter cylindrical rod shape is inserted into the circular hole of rotor shaft 86. The pin 90 is inserted into the rotor shaft 86 through the circular hole in the diametrical direction of the shaft 86 such that opposite ends of the pin 90 protrude outside the outer circumferential surface of the rotor shaft 86 in radial directions.

The motor 84 is mounted to a support member 94. The support member 94 has a thick, circular ring shape and is made of hard plastic. Further, the upper end of the support member 94 is provided around the outer edge thereof with a contact part 96, which is bent outwards and is, thereafter, bent upwards to form an outer circumferential part.

Further, a holding tub part 98 is defined inside an inner circumferential surface of the support member 94. The holding tub part 98 has a cylindrical shape and extends upwards to a predetermined height from the inner circumferential surface of the support member 94. Further, the holding tub part 98 is provided with two guide notches 100, which are formed at diametrically opposite positions in the holding tub part 98 by cutting the inner circumferential surface of the holding tub part 98 from predetermined positions to the top end. Each of the guide notches 100 has a groove shape extending to a predetermined length in an axial direction, with opposite side surfaces thereof extending in parallel to each other.

Further, the motor 84 is fitted into a central bore of the support member 94 such that the rotor shaft 86 of the motor 84 extends along the central axis of the central bore of the support member 94. Thus, the rotor shaft 86 is placed inside the holding tub part 98 in a state in which the rotor shaft 86 is spaced apart from the inner circumferential surface of the holding tub part 98 by a predetermined distance.

Further, a valve unit 116 functioning as a movable valve body is installed at a location around the end of the rotor shaft 86. The valve unit 116 is a cap-shaped cylindrical body, which is open downwards and is made of hard plastic. Further, the upper end of the valve unit 116 is provided with a pressure-flanged portion 104, which integrally extends outwards in radial directions so as to protrude outwards from the outer circumferential surface of the valve unit 116. The outer circumferential edge of the pressure-flanged portion 104 is cut off so as to form a rounded shape when the pressure-flanged portion 104 is taken along an axial direction.

Further, the lower end of the valve unit 116 is provided with two guide protrusions 106, which extend outwards in radial directions from diametrically opposite positions. Each of the guide protrusions 106 is a block-shaped protrusion, with opposite side surfaces thereof extending in parallel to each other. Further, the thickness of each of the guide protrusions 106 in a circumferential direction is almost equal to the width of an associated guide notch 100 formed in the holding tub part 98. Further, the axial length of each of the guide protrusions 106 is substantially shorter than the axial length of each of the guide notches 100.

Further, a cam groove 118 is formed in the lower surface of the valve unit 116. The cam groove 118 is provided with two upper support parts 120, which are diametrically opposed to each other, and two lower support parts 122, which are perpendicular to the axis of the two upper support parts 120 and are diametrically opposed to each other at locations lower than the positions of the upper support parts 120 in axial directions. Each of the upper support parts 120 and the lower support parts 122 is configured in a planar shape, which is enlarged in a radial direction and extends to a predetermined length in a circumferential direction.

Further, the upper support parts 120 and the lower support parts 122, which are adjacent to each other in a circumferential direction, are connected to each other by inclined guides 124. The upper support parts 120, the lower support parts 122 and the inclined guides 124 form the cam groove 118, which extends around the circumference. Further, the upper support parts 120, the lower support parts 122 and the inclined guides 124 are smoothly connected to each other without leaving behind any bent portion in the junctions thereof. The inclined guides 124 are inclined and extend in a rounded manner in radial directions.

Figure 3:
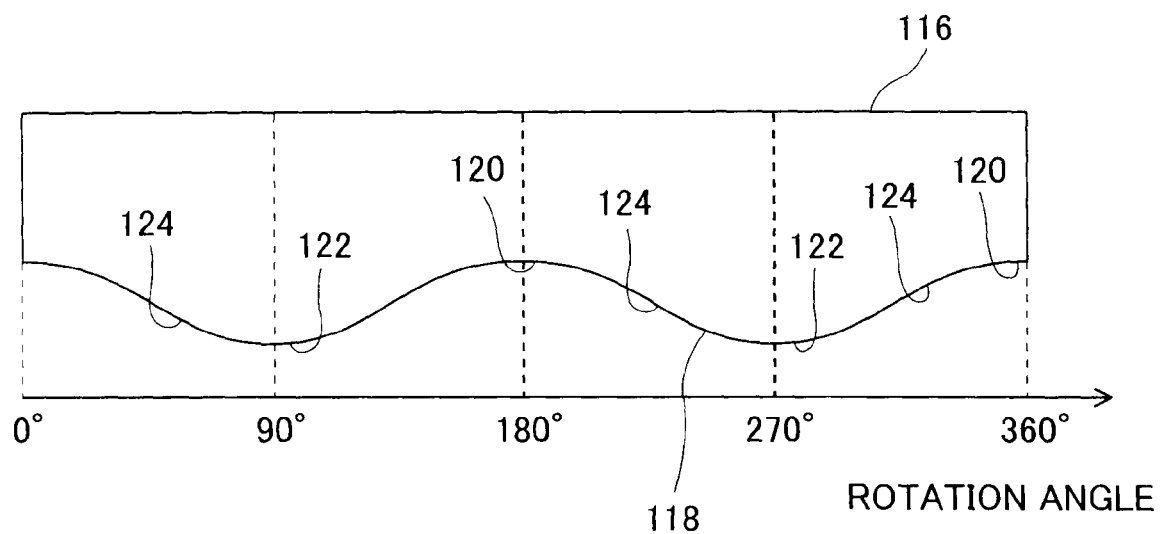
FIG. 3 is a development view of a cam groove when the cam groove is developed along a circumferential direction.

FIG. 3 is a development view of a cam groove 118 when the cam groove 118 is developed along a circumferential direction. As shown in FIG. 3, at diametrically opposite positions (positions angularly spaced apart from each other at an angle of 180° in a circumferential direction), portions of the cam groove 118 are placed at the same height in an axial direction. That is, when a first upper support part 120 is formed at a location denoted by 0° in FIG. 3, a second upper support part 120 is formed at another location angularly spaced apart from the 0° angular location at an angle of 180°. In the above case, the lower support parts 122 are formed at respective locations denoted by 90° and 270° in FIG. 3.

The valve unit 116 having the above-mentioned cam groove 118 is mounted to the rotor shaft 86. Described in detail, the valve unit 116 covers the rotor shaft 86 downwards in an axial direction and the pin 90 perpendicularly passing through the rotor shaft 86 comes into upward contact with the cam groove 118, so that the valve unit 116 can be supported by the pin 90. Therefore, a cam mechanism, comprising the pin 90 and the cam groove 118, is formed at a junction between the rotor shaft 86 and the valve unit 116. Further, the diametrically opposite portions in the cam groove 118 are placed at the same height in the axial direction, so that the diametrically opposite protruding ends of the pin 90 can be inserted into the cam groove 118. Thus, the valve unit 116 can be concentrically placed relative to the rotor shaft 86 without being inclined relative to the rotator shaft 86.

The cam mechanism is installed on a drive force transmitting path extending from the motor 84 to the valve unit 116. Thus, the rotational drive force of the motor 84 is transmitted to the valve unit 116 in the form of a reciprocating drive force. Further, the reciprocating position of the valve unit 116 is determined by the rotational position (rotation angle) of the rotor shaft 86 of the motor 84. The rotor shaft 86 of the motor 84 is configured to be stopped at every 90° angular position. In other words, when the rotor shaft 86 rotates, the pin 90 may be placed at respective angular positions of 0°, 90°, 180° and 270° in FIG. 3, so that the rotor shaft 86 can stop at the angular positions. Thus, due to a rotation of the motor 84, the pin 90 can stop at angular positions at which the pin 90 is in contact with the upper support parts 120 and at angular positions at which the pin 90 is in contact with the lower support parts 122. Here, at the angular positions at which the pin 90 is in contact with the upper support parts 120, the valve unit 116 is located at a lower position thereof. However, at the angular positions at which the pin 90 is in contact with the lower support parts 122, the valve unit 116 is located at an upper position thereof. That is, when the motor 84 rotates, the valve unit 116 reciprocates between the upper and lower positions. The operation of the rotor shaft 86 will be described in more detail later herein.

Here, in the engine mount 10, the actuator 114 is placed below the mounting body 11 and the valve unit 116 can be placed at a location spaced apart from the central contact part 34 of the diaphragm 32 by a predetermined distance in an axial direction or at another location at which the valve unit 116 overlaps the lower surface of the central contact part 34 of the diaphragm 32.

In other words, the actuator 114 is placed to be opposed to the partition unit 42 with the diaphragm 32 interposed between the actuator 114 and the partition unit 42. In other words, the valve unit 116 of the actuator 114 is placed to be opposed to the central depression 48, which functions as the opening of the equilibrium chamber 66 of the second orifice passage 72, with the central contact part 34 of the diaphragm 32 interposed between the valve unit 116 and the central depression 48.

Further, as shown in FIG. 1 and FIG. 2, the valve unit 116 executes a reciprocating motion in an axial direction, thus being in contact with or spaced apart from the central contact part 34 of the diaphragm 32. Further, the central contact part 34 of the diaphragm 32 can be displaced upwards or downwards in accordance with the axial reciprocating motion of the valve unit 116. Thus, due to operation of the valve unit 116, the central contact part 34 of the diaphragm 32 can change between two states, which are a contact state at which the central contact part 34 comes into contact with the central depression 48 of the partition unit 42 and a spaced state at which the central contact part 34 is spaced apart from the central depression 48 of the partition unit 42.

As shown in FIG. 2, when the valve unit 116 is placed at the lower position during the reciprocating motion thereof, the valve unit 116 is spaced downwards apart from the central contact part 34 of the diaphragm 32. Further, in the above state, the central contact part 34 is spaced downwards apart from the partition unit 42, so that the central depression 48 is open to the equilibrium chamber 66.

As shown in FIG. 1, when the valve unit 116 is placed at the upper position during a reciprocating motion thereof, the central contact part 34 of the diaphragm 32 is pressurized by the valve unit 116, thus coming into pressure contact with the lower surface of the partition unit 42, so that the opening of the central depression 48 is closed by the valve unit 116 through operation of the central contact part 34.

Thus, in the present invention, the opening of the central depression 48, which functions as an opening of the equilibrium chamber 66 of the second orifice passage 72, can be changed between an opened state (the state shown in FIG. 2) and a closed state (the state shown in FIG. 1) by controlling the reciprocating motion of the valve unit 116 as described above. Described in brief, the vibration damping device of the present invention is configured to change the state of the second orifice passage 72 between an opened state and a closed state. Thus, to realize the first vibration damping effect for attenuating a vibration within a low frequency band, such as an engine shake frequency band, in a driving state of a vehicle, the valve unit 116 is placed at the upper position so as to make the closed state of the second orifice passage 72. However, to realize the second vibration damping effect for attenuating a vibration within a high frequency band, such as an idling vibration frequency band, in an idling state of the vehicle, the valve unit 116 is placed at the lower position so as to make the opened state of the second orifice passage 72.

(2) Description for Both the Control Unit and the Brush Unit

Figure 4:
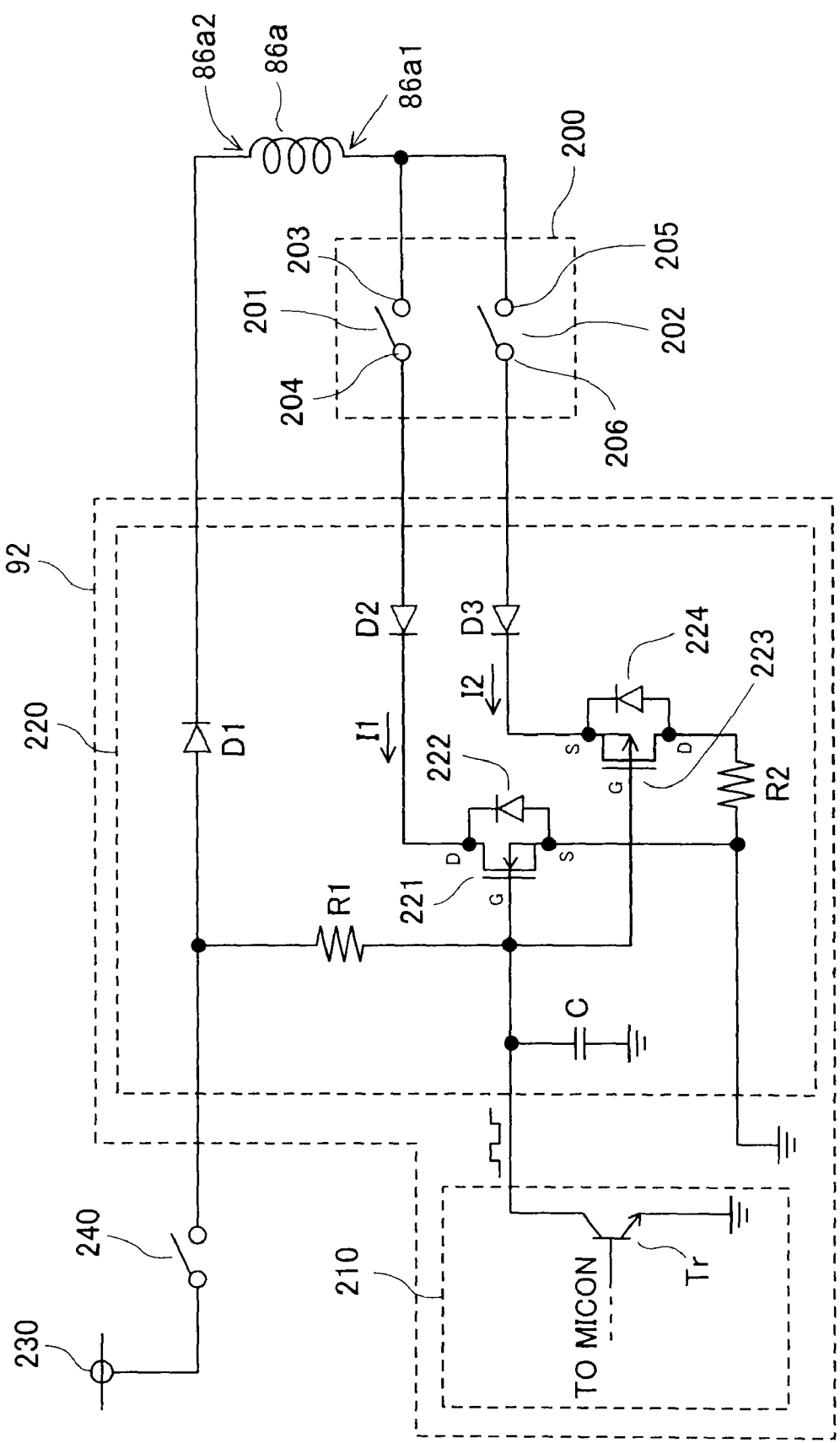
FIG. 4 is a circuit diagram of a control unit according an embodiment of the present invention.
Figure 5:
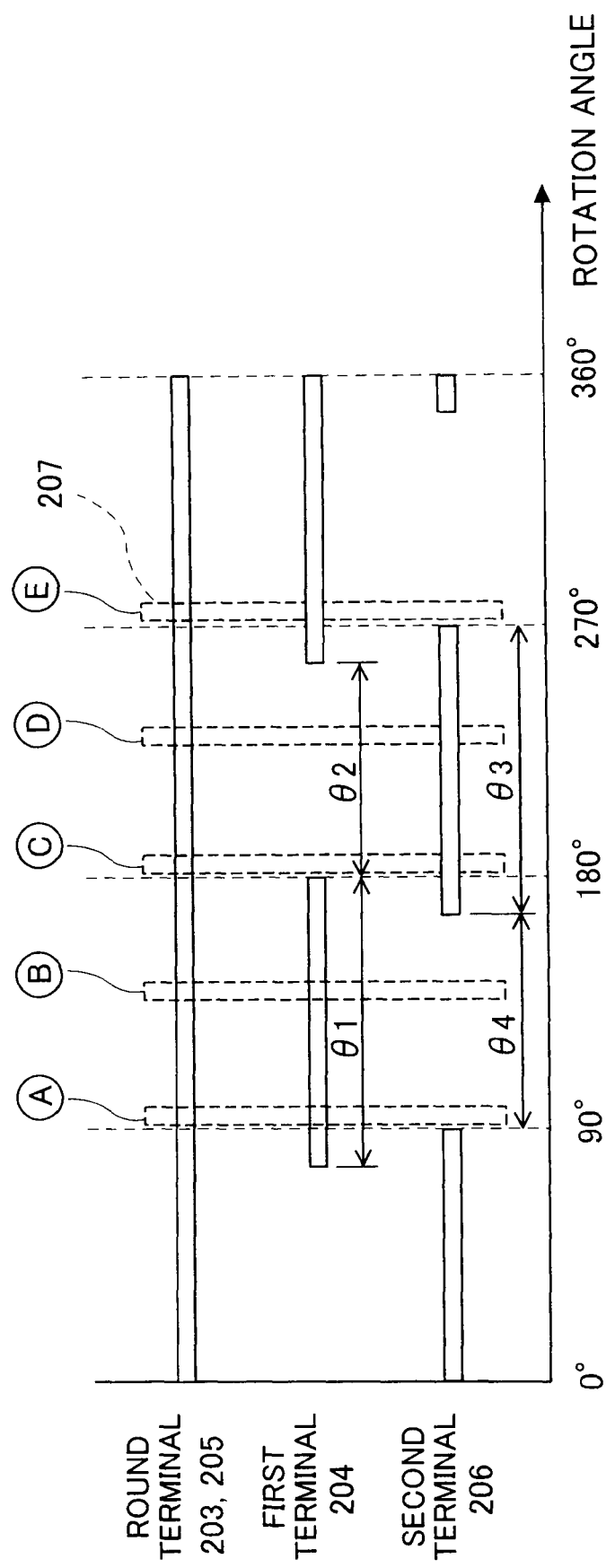
FIG. 5 is a view illustrating terminals and a brush constituting a brush unit, when the brush unit is developed along a circumferential direction of a rotor shaft.
Figure 6:
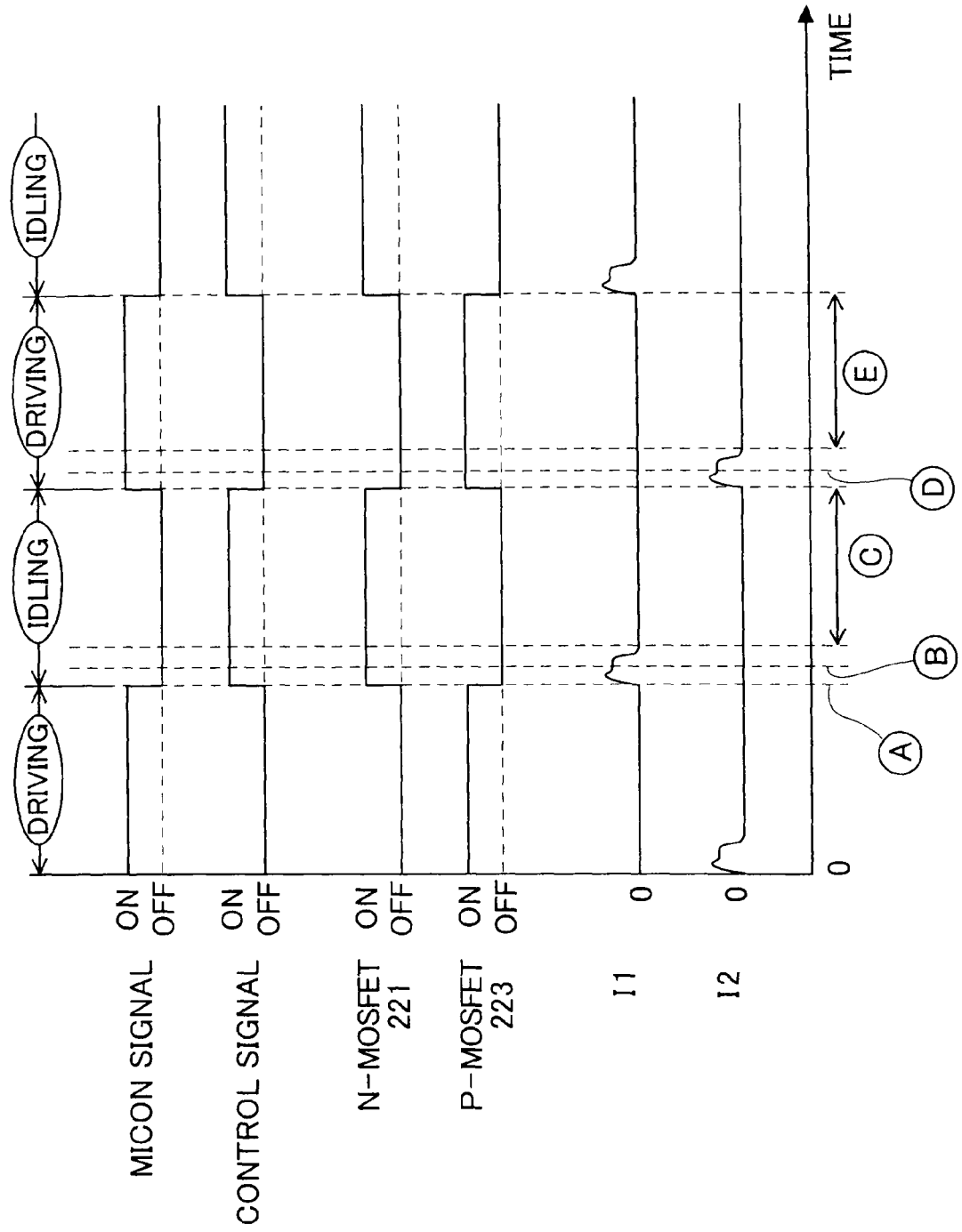
FIG. 6 is a timing chart illustrating operation of the control unit and brush unit.

Hereinbelow, both the control unit 92 and the brush unit 200 will be described with reference to FIG. 4 through FIG. 6. FIG. 4 is a circuit diagram illustrating the control unit 92. FIG. 5 is a view illustrating terminals 203, 204, 205 and 206 and a brush 207 constituting the brush unit 200, when the brush unit 200 is developed along a circumferential direction of the rotor shaft 86. FIG. 6 is a timing chart illustrating operation of both the control unit 92 and the brush unit 200.

As shown in FIG. 4, the control unit 92 comprises an engine ECU 210 for controlling the operation of an engine and a motor drive circuit 220 for driving the motor 84. The engine ECU 210 is an ECU for controlling operation of an engine using, for example, a speed sensor and an opening ratio of a throttle valve. The engine ECU 210 can determine whether the engine is in an idling state generating an idling vibration or in a driving state generating an engine shake vibration using a variety of data about the engine. In the embodiment of the present invention, the microcomputer of the engine ECU 210, which functions as a control signal output unit, generates a microcomputer (micon) signal, which indicates whether an engine shake is being generated or not. That is, the micon signal is an ON signal when a vehicle is in a driving state and is an OFF signal when the vehicle is not in the driving state, that is, when the vehicle is in an idling state. Here, the micon signal is a square wave signal comprising an ON signal and an OFF signal. The ON signal is a voltage signal, which is, for example, a 5V signal, not a 0V signal, and the OFF signal is a 0V signal.

Further, the micon signal output from the microcomputer of the engine ECU 210 is applied to the base of an npn-type transistor Tr embedded in the engine ECU 210. The emitter of the npn-type transistor Tr is grounded. The collector of the npn-type transistor Tr is connected to a battery 230 both through a motor drive circuit 220 and through an ignition switch 240.

When the micon signal is an ON signal, the output signal of the engine ECU 210, that is, the ECU control signal which is a collector voltage of the npn-type transistor Tr is an OFF signal, and when the micon signal is an OFF signal the ECU control signal is an ON signal. Described in detail, when the micon signal is an ON signal, the collector voltage is 0V. Meanwhile, when the micon signal is an OFF signal, the collector voltage is fulfilled with the battery voltage supplied from the battery 230. Described in brief, when the vehicle is in an idling state, the ECU control signal is an ON signal, which has a predetermined voltage other than 0V, and when the vehicle is in a driving state, the ECU control signal is an OFF signal, which has 0V.

The brush unit 200 forms a first rotation angle switch 201 and a second rotation angle switch 202. The first rotation angle switch 201 is connected at one terminal 203 thereof to a first stage 86a1 of the motor coil 86a. The other terminal 204 of the first rotation angle switch 201 is connected to the drain of an N-channel MOSFET 221 of the motor drive circuit 220. The second rotation angle switch 202 is connected at one terminal 205 thereof to a first stage 86a1 of the motor coil 86a. The second terminal 206 of the second rotation angle switch 202 is connected to the source of a P-channel MOSFET 223 of the motor drive circuit 220.

The first rotation angle switch 201 is connected to the motor coil 86a in series. The first rotation angle switch 201 is turned on when the rotation angle of the rotor shaft 86 of the motor 84 is within a first angular range θ1, and is turned off when the rotation angle of the rotor shaft 86 is within a second angular range θ2 which is different from the first angular range θ1 (an angular range other than the first angular range θ1). Further, the second rotation angle switch 202 is connected to the motor coil 86a in series and is connected to the first rotation angle switch 201 in parallel. The second rotation angle switch 202 is turned on when the rotation angle of the rotor shaft 86 of the motor 84 is within a third angular range θ3, and is turned off when the rotation angle of the rotor shaft 86 is within a fourth angular range θ4 which is different from the third angular range θ3 (an angular range other than the third angular range θ3). The first, second, third and fourth angular ranges θ1, θ2, θ3 and θ4 are shown in FIG. 5.

Hereinbelow, respective terminals 203~206, constituting the brush unit 200, and the brush 207 used for electrically connecting and disconnecting the terminals will be described with reference to FIG. 5. The rotation angle of the rotor shaft 86a shown in FIG. 5 is equal to the rotation angle of the rotor shaft 86 shown in FIG. 3.

The brush unit 200 comprises a round terminal, a first terminal, a second terminal, and the brush 207. The round terminal is formed around the rotor shaft 86 of the motor 84 such that the round terminal can cover the angular rotational range of the motor 84, and forms both the terminal 203 of the first rotation angle switch 201 and the terminal 205 of the second rotation angle switch 201. The round terminal, forming the terminals 203 and 205, has a circular ring shape.

The first terminal is formed in the rotor shaft 86 of the motor 84 at a location within the first angular range θ1 of the motor 84 and forms the terminal 204 of the first rotation angle switch 201. The location of the first terminal 204 is closer to the rotational center of the rotor shaft 86 than that of the round terminal 203, 205 and has a circular ring shape with a diameter smaller than that of the round terminal 203, 205. The first angular range θ1, in which the first terminal 204 is formed, includes a range of 80°~180° and a range of 260°~360° in FIG. 5. Further, the second angular range θ2 includes a range of 0°~80° and a range of 180°~260° in FIG. 5.

The second terminal is formed in the rotor shaft 86 of the motor 84 at a location within the third angular range θ3 of the motor 84 and forms the terminal 206 of the second rotation angle switch 202. The location of the second terminal 206 is closer to the rotational center of the rotor shaft 86 than that of the first terminal 204 and has a circular ring shape with a diameter smaller than that of the first terminal 204. The third angular range θ3, in which the second terminal 206 is formed, includes a range of −10°(350°)~90° and a range of 170°~270° in FIG. 5. Further, the fourth angular range θ4 includes a range of 90°~170° and a range of 270°~350° in FIG. 5.

That is, the first angular range θ1 is an angular range including at least the fourth angular range θ4. The third angular range θ3 is an angular range including at least the second angular range θ2. When one rotational direction of the motor 84 is set to a first direction (direction from the left to the right in FIG. 5), the first directional end of the first angular range θ1, that is, the right-side end of the first angular range θ1, is included in the third angular range θ3. Further, the first directional end of the third angular range θ3, that is, the right-side end of the third angular range θ3 in FIG. 5, is included in the first angular range θ1.

The brush 207 is shown by the dotted line in FIG. 5. The brush 207 is mounted to the stator 85 of the motor 84 and is rotated by the rotation of the motor 84. The radial directional outer end of the brush 207 is located outside the round terminal 203, 205 and the radial directional inner end of the brush 207 is located inside the second terminal 206. The brush 207 is always in contact with the round terminal 203, 205 and can come into contact with either the first terminal 204 or the second terminal 206.

The motor drive circuit 220 comprises a first diode D1, a second diode D2, a third diode 3, a first resistor R1, a second resistor R2, an N-channel MOSFET 221 functioning as a first control switch, a first flywheel diode 222, a P-channel MOSFET 223 functioning as a second control switch, a second flywheel diode 224, and a condenser C.

The first diode D1 is connected at the anode to the battery 230 through the ignition switch 240 and is connected at the cathode to the second stage 86a2 of the motor coil 86a. The first diode D1 is used for preventing a reverse flow of the electric current toward the motor coil 86a. The second diode D2 is connected at the anode to the terminal 204 of the first rotation angle switch 201 and is connected at the cathode to the drain of the N-channel MOSFET 221. The third diode D3 is connected at the anode to the terminal 206 of the second rotation angle switch 202 and is connected at the cathode to the source of the P-channel MOSFET 223.

The first resistor R1 is connected at a first end thereof to the anode of the first diode D1 and is connected at a second end thereof to the output signal line extending from the engine ECU 210, that is, to the collector of the npn-type Transistor Tr. The second resistor R2 is grounded at a first end thereof and is connected at a second end thereof to the drain of the P-channel MOSFET 223. The condenser C is connected at a first end thereof to the second end of the first resistor R1 and is grounded at a second end thereof.

The N-channel MOSFET 221 is connected at the drain thereof to the terminal 204 of the first rotation angle switch 201 through the second diode D2, and is grounded at the source thereof, and is connected at the gate thereof to the output signal line of the engine ECU 210. In other words, the N-channel MOSFET 221 is connected to the first rotation angle switch 201 in series and is connected to the second rotation angle switch 202 in parallel. Further, the flywheel diode 222 is connected to the N-channel MOSFET 221 in parallel.

The P-channel MOSFET 223 is connected at the source to the terminal 206 of the second rotation angle switch 202 through the third diode D3 and is grounded at the drain through the second resistor R2, and is connected at the gate to the output signal line of the engine ECU 210. In other words, the N-channel MOSFET 221 is connected to the second rotation angle switch 201 in series and is connected both to the second rotation angle switch 202 and to the N-channel MOSFET 223 in parallel. Further, the flywheel diode 224 is connected to the P-channel MOSFET 223 in parallel.

In operation, when the ECU control signal output from the engine ECU 210 is an ON signal, an electric current flows from the drain to the source of the N-channel MOSFET 221, but no electric current flows from the source to the drain of the P-channel MOSFET 223. Further, when the ECU control signal output from the engine ECU 210 is an OFF signal, no electric current flows from the drain to the source of the N-channel MOSFET 221, but an electric current flows from the source to the drain of the P-channel MOSFET 223. As described above, in response to the same signal, the N-channel MOSFET 221 and the P-channel MOSFET 223 can realize respective ON/OFF states, which are opposed to each other.

(3) Operation of Respective Elements

Hereinbelow, operations of the engine ECU 210, the motor drive circuit 220, the brush unit 200 and the motor 84 will be described with reference both to the development view of the brush 200 of FIG. 5 and to the timing chart of FIG. 6.

In FIG. 5, when the brush 207 is located at position A, the ON state of the first rotation angle switch 201 and the OFF state of the second rotation angle switch 202 are set to their respective initial states. Further, in FIG. 6, the position A of the brush 207 is set to an initial state of the brush 207. The positions A, B, C, D and E of the brush 207 shown in FIG. 5 correspond to the positions A, B, C, D and E shown in FIG. 6, respectively. That is, when the brush 207 is located at position A in FIG. 5, this means that the brush 207 is located at position A in FIG. 6. Here, at position A in FIG. 5, the rotor shaft 86 of the motor 84 has been rotated to an angular position near 90°, so that the valve unit 116 is located at the upper position, as shown in FIG. 1. Thus, in the above state, the second orifice passage 72 is in the closed state.

(A) At position A, the state of the engine has been changed from a driving state to an idling state. Thus, as shown by the first stage in FIG. 6, the micon signal is an OFF signal. In the above state, the ECU control signal is an ON signal as shown by the second stage in FIG. 6. Thus, as shown by the third and fourth stages in FIG. 6, the N-channel MOSFET 221 realizes an ON state and the P-channel MOSFET 223 realizes an OFF state. In the above state, as shown in FIG. 5, the brush 207 is in a contact state, in which the brush 207 connects the round terminal 203, 205 to the first terminal 204. In other words, the first rotation angle switch 201 is in an ON state.

Therefore, the first rotation angle switch 201 and the N-channel MOSFET 221, which are connected to each other in series, realize their respective ON states. Further, an electric current is applied to the motor coil 86a. Thus, the electric current value I1 in the region between the first rotation angle switch 201 and the N-channel MOSFET 221 in FIG. 4 realizes a positive value, as shown by the fifth stage in FIG. 6.

Thus, the rotor shaft 86 of the motor 84 starts to rotate. Here, the brush 207 rotates in response to the rotation of the rotor shaft 86 of the motor 84. In the above state, the brush 207 moves in a direction in which the rotation angle thereof increases or to the right-side in FIG. 5.

(B) Thus, the brush 207 moves to position B in FIG. 5. At position B, both the first rotation angle switch 201 and the N-channel MOSFET 221 realize their respective ON states in the same manner as that described for position A, so that an electric current is applied to the motor coil 86a.

(C) In the above state, the rotor shaft 86 of the motor 84 further rotates until it reaches the right-side end of the first angular range θ1 in which the first terminal 204 is formed. Thus, the brush 207 reaches position C in FIG. 5. Position C in FIG. 5 is a position which exceeds the first angular range θ1. Thus, the brush 207 in the above state is located at a position exceeding the first terminal 204 and the first rotation angle switch 201 realizes an OFF state.

Here, as shown in FIG. 6, at position C, the ECU control signal is an ON signal, so that the N-channel MOSFET 221 realizes an ON state. However, because the first rotation angle switch 201 in the above state is in an OFF state, the path of the motor coil 86a passing the first rotation angle switch 201 within the path from the first stage 86a1 of the motor coil 86a to the grounded stage is closed. Thus, the electric current value I1 in the region between the first rotation angle switch 201 and the N-channel MOSFET 221 shown in FIG. 4 becomes zero, as shown by the fifth stage in FIG. 6.

At position C, the brush 207 is in contact with the second terminal 206. Thus, in the above state, the second rotation angle switch 202 realizes an ON state. However, when the ECU control signal in the above state is an ON signal, the P-channel MOSFET 223 can realize an OFF state, as shown by the fourth stage in FIG. 6. Thus, the path of the motor coil 86a passing the second rotation angle switch 202 within the path from the first stage 86a1 of the motor coil 86a to the grounded stage is closed. Thus, the electric current value I2 in the region between the second rotation angle switch 202 and the P-channel MOSFET 223 shown in FIG. 4 becomes zero, as shown by the sixth stage in FIG. 6.

Thus, at the time the brush 207 reaches position C, the supply of electric current to the motor coil 86a is stopped, so that the rotation of the rotor shaft 86 of the motor 84 stops, thus determining the angular position of the rotor shaft 86 at that position. In this case, the state associated with position C in FIG. 6 is continued during a period in which the micon signal is kept as an OFF signal indicative of an idling state of the engine.

Here, at position C in FIG. 5, the angular position of the rotor shaft 86 of the motor 84 is around the 180° position, so that the valve unit 116 is located at the lower position, as shown in FIG. 2. In the above state, the second orifice passage 72 is opened. Thus, when the engine realizes an idling state, the second orifice passage 72 can be changed from a closed state to an opened state by supplying an electric current to the motor coil 86a for a predetermined short period of time just after the start of the idling state (the period of time wherein the brush 207 moves from position A to position C in FIG. 6). Thereafter, while the idling state of the engine continues, the second orifice passage 72 can be kept in the opened state without supplying an electric current to the motor coil 86a.

In operation of the vibration damping device of the present invention, the rotor shaft 86 of the motor 84 rotates at a very high speed. Thus, the period from the time the ECU control signal is changed to an ON signal to the time the ECU control signal is changed to an OFF signal is sufficiently longer than the period from the time the ECU control signal is changed to the ON signal to the time the first rotation angle switch 201 is changed to an OFF state. Therefore, when the rotor shaft 86 of the motor 84 rotates, the ECU control signal does not change from an ON signal to an OFF signal, so that the vibration damping device of the present invention can reliably execute the desired operation.

When the idling state of the engine changes to a driving state as shown in FIG. 6, the micon signal becomes an ON signal and the ECU control signal becomes an OFF signal. Thus, the N-channel MOSFET 221 realizes an OFF state and the P-channel MOSFET 223 realizes an ON state.

Here, at position C, the brush 207 comes into contact with the second terminal 206, as shown in FIG. 5. Thus, the second rotation angle switch 202 is in an ON state. Further, at a region around position C in FIG. 6, there is an angular range wherein the first terminal 204 and the second terminal 206 overlap each other. Thus, when the brush 207 is placed outside the first terminal 204, the brush 207 is inevitably brought into contact with the second terminal 206.

In the above state, both the second rotation angle switch 202 and the P-channel MOSFET 223, which are connected to each other in series, come into their respective ON states in which an electric current is supplied to the motor coil 86a. In other words, the electric current value I2 in a region between the second rotation angle switch 202 and the P-channel MOSFET 222 in FIG. 4 becomes a positive value, as shown at the fifth stage in FIG. 6.

Thus, the rotor shaft 86 of the motor 84 starts a rotation. Here, the brush 207 rotates in response to the rotation of the rotor shaft 86 of the motor 84. Thus, the brush 207 moves in a direction in which the rotation angle increases in FIG. 5, that is, the brush 207 moves to the left in the drawing.

(D) Therefore, the brush 207 in the above state moves to position D in FIG. 5. At D position, both the second rotation angle switch 202 and the P-channel MOSFET 223 are in their respective ON states, so that the electric current is supplied to the motor coil 86a.

(E) The rotor shaft 86 of the motor 84 in the above state is further rotated until it reaches the right-side end of the third angular range θ3, in which the second terminal 206 is formed. In other words, the brush 207 moves to position E in FIG. 5. Position E is a position exceeding the third angular range θ3, as shown in FIG. 5. At position E, the brush 207 is placed outside the second terminal 206 and the second rotation angle switch 202 is in an OFF state.

Here, at position E in FIG. 6, the ECU control signal is an OFF signal, so that the P-channel MOSFET 223 is in an ON state. However, the second rotation angle switch 202 in the above state is in an OFF state, so that the path of the motor coil 86a passing the second rotation angle switch 202 within the path from the first stage 86a1 of the motor coil 86a to the grounded stage is closed. Thus, the electric current value I2 in the region between the second rotation angle switch 202 and the P-channel MOSFET 223 shown in FIG. 4 becomes zero, as shown by the fifth stage in FIG. 6.

At position E, the brush 207 is in contact with the first terminal 204. Thus, the first rotation angle switch 201 is in an ON state. However, when the ECU control signal is an OFF signal, the N-channel MOSFET 221 is in an OFF state, as shown by the fourth stage in FIG. 6. Thus, the path of the motor coil 86a passing the first rotation angle switch 201 within the path from the first stage 86a1 of the motor coil 86a to the grounded stage is closed. Thus, the electric current value I1 in the region between the first rotation angle switch 201 and the N-channel MOSFET 221 shown in FIG. 4 becomes zero, as shown by the sixth stage in FIG. 6.

Thus, at the time the brush 207 reaches position E, the supply of an electric current to the motor coil 86a has stopped, so that the rotation of the rotor shaft 86 of the motor 84 is stopped, thus determining the angular position of the rotor shaft 86 at that position. In this case, the state associated with position E in FIG. 6 is continued during a period in which the micon signal is kept as an ON signal indicative of a driving state of the engine.

Here, at position E in FIG. 5, the angular position of the rotor shaft 86 of the motor 84 is around the 270° position, so that the valve unit 116 is located at the upper position, as shown in FIG. 1. In the above state, the second orifice passage 72 is closed. Thus, when the engine realizes a driving state, the second orifice passage 72 can be changed from an opened state to a closed state by supplying an electric current to the motor coil 86a for a predetermined short period of time just after the start of the driving state (the period of time wherein the brush 207 moves from position C to the position E in FIG. 6). Thereafter, while the driving state of the engine continues, the second orifice passage 72 can be kept in the closed state without supplying an electric current to the motor coil 86a.

In operation of the vibration damping device of the present invention, the rotor shaft 86 of the motor 84 is rotated at a very high speed. Thus, the period from the time the ECU control signal is changed to an OFF signal to the time the ECU control signal is changed to an ON signal is sufficiently longer than the period from the time the ECU control signal is changed to the OFF signal to the time the second rotation angle switch 202 is changed to an OFF state. Therefore, when the rotor shaft 86 of the motor 84 is rotated, the ECU control signal is not changed from an OFF signal to an ON signal, so that the vibration damping device of the present invention can reliably execute the desired operation.

During the operation of the vibration damping device of the present invention, the above-mentioned changing operation is repeated. That is, when the state of the engine is changed from an idling state to a driving state, the second orifice passage 72 can be changed from an opened state to a closed state only by supplying an electric current to the motor coil 86a just after the changing of the engine state. Meanwhile, when the state of the engine is changed from a driving state to an idling state, the second orifice passage 72 can be changed from a closed state to an opened state only by supplying an electric current to the motor coil 86a just after the changing of the engine state.

As described above, the Fluid-filled type vibration damping device of the present invention is advantageous in that it uses a cam mechanism and switches so that it can maintain a desired angular rotational position of the rotor shaft 86 of the motor 84 without continuously supplying an electric current to the motor coil 86a. Thus, the Fluid-filled type vibration damping device of the present invention can reduce the electric power consumption, can reduce the quantity of heat generated from the motor coil 86a and can improve the durability of the motor.

Further, the ECU control signal can stop a rotation of the motor 84 using one signal comprising an ON/OFF signal. Thus, the present invention can easily produce the ECU control signal and can prevent an increase in the number of contact ports in the motor drive circuit 220.

First Modification

Figure 7:
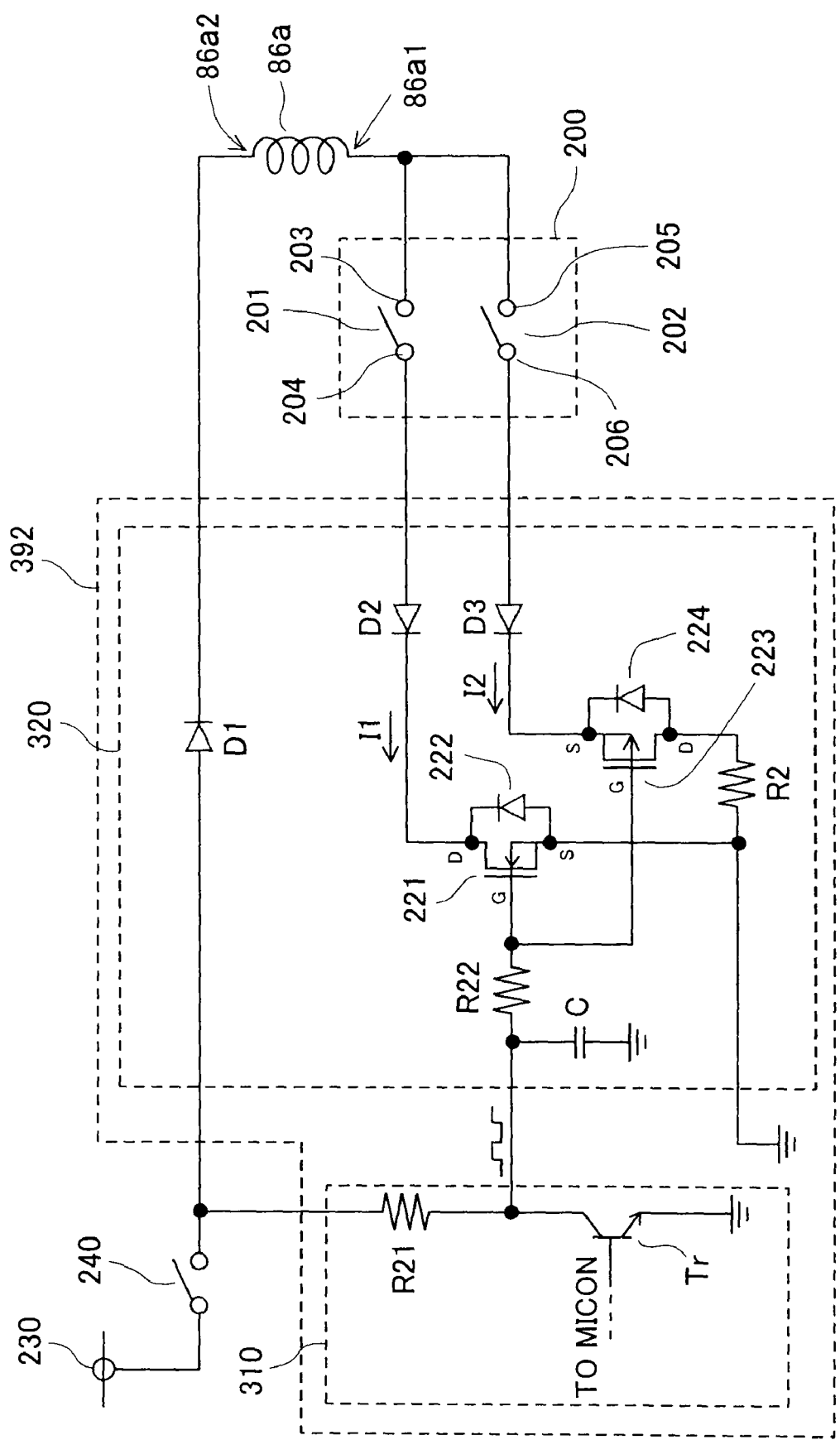
FIG. 7 is a circuit diagram of a control unit according to a modification of the embodiment of the present invention.

Hereinbelow, a first modification of the control unit 92 according to the above-mentioned embodiment will be described. The description for the control unit 392 according to the first modification will be carried out with reference to FIG. 7. FIG. 7 is a circuit diagram illustrating the construction of the control unit 392. In FIG. 7, the same members as those of the control unit 92 according to the above-mentioned embodiment are denoted by the same reference numerals as those in the embodiment, and description thereof is omitted from the following description for the control unit 392 of the first modification.

As shown in FIG. 7, the control unit 392 comprises an engine ECU 310 for controlling operation of an engine and a motor drive circuit 320 for driving a motor 84. The engine ECU 310 is an ECU for controlling operation of an engine (not shown) using, for example, a speed sensor and an opening ratio of a throttle valve. The engine ECU 310 can determine whether the engine is in an idling state generating an idling vibration or in a driving state generating an engine shake vibration using a variety of data about the engine. In the first modification of the present invention, the microcomputer of the engine ECU 310, which functions as a control signal output unit, generates a micon signal, which indicates whether an engine shake is being generated or not. That is, the micon signal is an ON signal when the engine is in a driving state and is an OFF signal when the engine is not in the driving state, that is, when the engine is in an idling state. Here, the micon signal is a square wave signal comprising an ON signal and an OFF signal. The ON signal is a voltage signal, which is, for example, a 5V signal, not a 0V signal, and the OFF signal is a 0V signal.

Further, the micon signal output from the microcomputer of the engine ECU 310 is applied to the base of an npn-type transistor Tr embedded in the engine ECU 310. The emitter of the npn-type transistor Tr is grounded. The collector of the npn-type transistor Tr is connected to a battery 230 both through a resistor R21 and through an ignition switch 240. Further, the collector of the npn-type transistor Tr is also connected to the motor drive circuit 320.

Thus, when the micon signal is an ON signal, the output signal of the engine ECU 310, that is, the ECU control signal which is a collector voltage of the npn-type transistor Tr is an OFF signal, and when the micon signal is an OFF signal, the ECU control signal is an ON signal. Described in detail, when the micon signal is an ON signal, the collector voltage is 0V. Meanwhile, when the micon signal is an OFF signal, the collector voltage is fulfilled with the battery voltage supplied from the battery 230. Described in brief, when the engine is in an idling state, the ECU control signal is an ON signal, which has a predetermined voltage other than 0V, and when the engine is in a driving state, the ECU control signal is an OFF signal, which has 0V.

The motor drive circuit 320 comprises a first diode D1, a second diode D2, a third diode D3, a second resistor R2, a third resistor R22, an N-channel MOSFET 221 functioning as a first control switch, a first flywheel diode 222, a P-channel MOSFET 223 functioning as a second control switch, a second flywheel diode 224, and a condenser C.

The third resistor R22 is connected at a first end thereof both to the gate of the N-channel MOSFET 221 and to the gate of the P-channel MOSFET 223, and is connected at a second end thereof to an output signal line extending from the engine ECU 310, that is, the second end of the third resistor R22 is connected to the collector of the npn-type transistor Tr. Further, the second end of the third resistor R22 is also connected to a first end of the condenser C.

That is, the gate of the N-channel MOSFET 221 is connected to an output signal line of the engine ECU 310 through the third resistor R22. Further, the gate of the P-channel MOSFET 223 is connected to the output signal line of the engine ECU 310 through the third resistor R22.

The control unit 392 according to the first modification of the invention executes the same operation and realizes the same effects as those in the above-mentioned embodiment.

Second Modification

Figure 8:
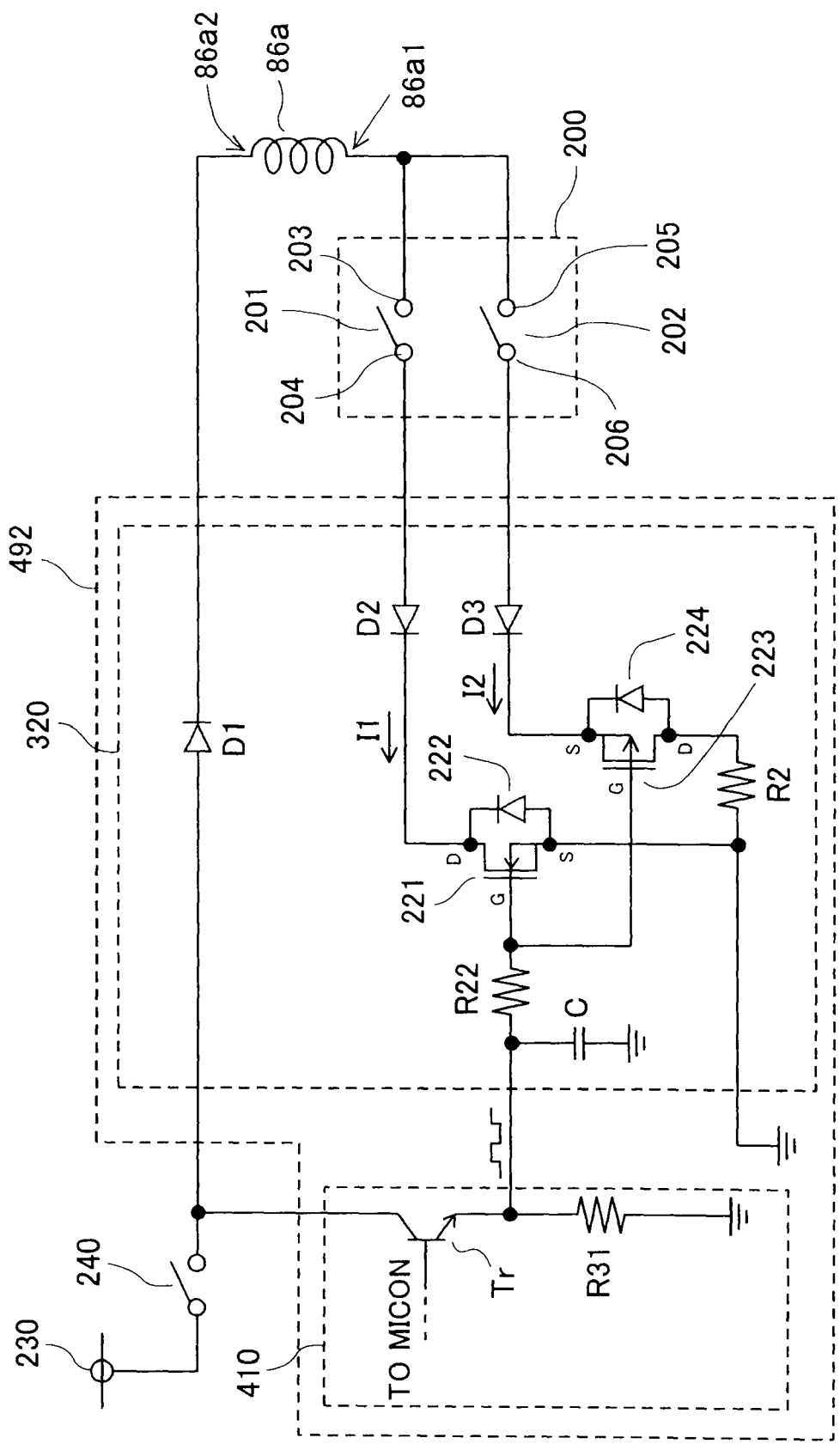
FIG. 8 is a circuit diagram of a control unit according to another modification of the embodiment of the present invention.

Hereinbelow, a second modification of the control unit 92 according to the above-mentioned embodiment will be described. The description for the control unit 492 according to the second modification will be carried out with reference to FIG. 8. FIG. 8 is a circuit diagram illustrating the construction of the control unit 492. In FIG. 8, the same members as those of the control unit 92 according to the above-mentioned embodiment or as those of the control unit 392 according to the first modification are denoted by the same reference numerals as those in the embodiment or in the first modification, and description thereof is omitted from the following description of the control unit 492 of the second modification.

As shown in FIG. 8, the control unit 492 comprises an engine ECU 410 for controlling the operation of an engine and a motor drive circuit 320 for driving a motor 84. The engine ECU 410 is an ECU for controlling operation of an engine (not shown) using, for example, a speed sensor and an opening ratio of a throttle valve. The engine ECU 410 can determine whether the engine is in an idling state generating an idling vibration or in a driving state generating an engine shake vibration using a variety of data of the engine. In the second modification of the present invention, the microcomputer of the engine ECU 410, which functions as a control signal output unit, generates a micon signal, which indicates whether an engine shake is being generated or not. That is, the micon signal is an ON signal when the engine is in a driving state and is an OFF signal when the engine is not in the driving state, that is, when the engine is in an idling state. Here, the micon signal is a square wave signal comprising an ON signal and an OFF signal. The ON signal is a voltage signal, which is, for example, a 5V signal, not a 0V signal, and the OFF signal is a 0V signal.

Further, the micon signal output from the microcomputer of the engine ECU 410 is applied to the base of an npn-type transistor Tr embedded in the engine ECU 410. The emitter of the npn-type transistor Tr is grounded through a resistor R31. The collector of the npn-type transistor Tr is connected to a battery 230 both through a motor drive circuit 220 and through an ignition switch 240. Further, the emitter of the npn-type transistor Tr is also connected to the motor drive circuit 320.

Thus, when the micon signal is an ON signal, the output signal of the engine ECU 410, that is, the ECU control signal which is an emitter voltage of the npn-type transistor Tr is an ON signal, and when the micon signal is an OFF signal, the ECU control signal is an OFF signal. Described in detail, when the micon signal is an ON signal, the emitter voltage is fulfilled with the battery voltage supplied from the battery 230. Meanwhile, when the micon signal is an OFF signal, the emitter voltage is 0V. Described in brief, when the engine is in an idling state, the ECU control signal is an OFF signal, which has 0V. Meanwhile, when the engine is in a driving state, the ECU control signal is an ON signal, which has a predetermined voltage other than 0V.

When the second modification is compared both to the embodiment and to the first modification, it is noted that the second modification is different both from the embodiment and from the first modification in that the relationship between the ON/OFF state of the micon signal and the ON/OFF state of the ECU control signal in the second modification is opposed to the relationships both in the embodiment and in the first modification. Thus, the ON/OFF states of the N-channel MOSFET 221 and the P-channel MOSFET 223 in the second modification are opposed to those in the embodiment and in the first modification. However, the motor 84 in the second modification realizes the same operation as those in the embodiment and in the first modification. Thus, the control unit 492 according to the second modification executes the same operation and realizes the same effects as those in the above-mentioned embodiment.

Further Modification

In a further modification, an N-channel MOSFET 221 may be used as the first control switch and a P-channel MOSFET 223 may be used as the second control switch. However, it should be understood that the selection of the first and second control switches is not limited to the N-channel MOSFET and the P-channel MOSFET. That is, switches, which can realize opposed ON/OFF states in response to the same ECU control input signals, may be used as the first and second control switches without affecting the functioning of the present invention. For example, the first and second control switches may be realized using respective N-channel MOSFETs. Of course, the first and second control switches may not be limited to the MOSFETs. It is possible to use conventional devices having switch functions as the first and second control switches.

While the invention has been shown and described with reference to preferred embodiments thereof, it will be understood by those skilled in the art that various changes and modifications may be made without departing from the spirit and scope of the invention as defined in the following claims.

What is claimed is:

1. A Fluid-filled type vibration damping device comprising:
   a main rubber elastic body connecting a first mounting member and a second mounting member to each other;
   a pressure-receiving chamber partially defined by a wall of the main rubber elastic body and charged with non-compressible fluid;
   an equilibrium chamber partially defined by a flexible film and charged with non-compressible fluid;
   a fluid passage communicating the pressure-receiving chamber with the equilibrium chamber;
   a movable valve body changing a state of the fluid passage between an opened state and a closed state through a reciprocating motion thereof;
   a motor rotated in response to an electric current supplied to a motor coil;
   a cam mechanism installed on a drive force transmitting path from the motor to the movable valve body and transmitting a rotational drive force of the motor to the movable valve body in the form of a reciprocating drive force;
   a control signal output unit outputting a control signal comprising an ON/OFF signal;
   a first rotation angle switch connected to the motor coil in series and turned on when a rotation angle of the motor is included within a first angular range and turned off when the rotation angle of the motor is included within a second angular range different from the first angular range;
   a first control switch connected to the first rotation angle switch in series and turned on when the control signal is an ON signal and turned off when the control signal is an OFF signal;
   a second rotation angle switch connected to the motor coil in series and connected both to the first rotation angle switch and to the first control switch in parallel and turned on when the rotation angle of the motor is included within a third angular range, and turned off when the rotation angle of the motor is included within a fourth angular range different from the third angular range; and
   a second control switch connected to the second rotation angle switch in series and connected both to the first rotation angle switch and to the first control switch in parallel and turned on when the control signal is an OFF signal, and turned off when the control signal is an ON signal,
   wherein the first angular range includes at least the fourth angular range, and
   the third angular range includes at least the second angular range.

2. The Fluid-filled type vibration damping device according to claim 1, wherein
   a period from a time at which the control signal is changed into an ON signal to a time at which the control signal is changed into an OFF signal is set to be longer than a period from a time at which the control signal is changed into an ON signal to a time at which the first rotation angle switch is turned off; and a period from a time at which the control signal is changed into an OFF signal to a time at which the control signal is changed into an ON signal is set to be longer than a period from a time at which the control signal is changed into an OFF signal to a time at which the second rotation angle switch is turned off.

3. The Fluid-filled type vibration damping device according to claim 1, wherein, when either rotating direction of the motor is set as a first direction, an end of the first directional of the first angular range is included in the third angular range; and an end of the first directional of the third angular range is included in the first angular range.

4. The Fluid-filled type vibration damping device according to claim 1, further comprising:

a round terminal formed around a rotor shaft of the motor such that the round terminal covers the rotation angular range of the motor, a first terminal formed on the rotor shaft of the motor at a location within the first angular range of the motor, and a second terminal formed on the rotor shaft of the motor at a location within the third angular range of the motor; and a brush mounted to a stator of the motor and coming into contact with the round terminal, the first terminal or the second terminal in response to a rotation of the motor, wherein the first rotation angle switch comprises the round terminal, the first terminal and the brush, and the second rotation angle switch comprises the round terminal, the second terminal and the brush.

5. The Fluid-filled type vibration damping device according to claim 1, wherein the motor generates a unidirectional rotational drive force.

6. The Fluid-filled type vibration damping device according to claim 1, wherein the motor is a DC motor.

7. The Fluid-filled type vibration damping device according to claim 1, wherein the fluid passage comprises a first orifice passage and a second orifice passage, which is tuned in a frequency higher than that in the first orifice passage, and the movable valve body switches the second orifice passage between an opened state and a closed state.

* * * * *